United States Patent Office 3,345,363
Patented Oct. 3, 1967

3,345,363
5α-HYDROXY-6β-AZIDOPREGNANES AND 5α-HYDROXY-6β-AMINOPREGNANES
Kanzo Sasaki, Osaka, Japan, assignor to Shionogi & Co., Ltd., Osaka, Japan
No Drawing. Filed July 11, 1963, Ser. No. 294,259
Claims priority, application Japan, July 17, 1962, 37/30,498
6 Claims. (Cl. 260—239.55)

The present invention relates to 5α-hydroxy-6β-azido-pregnanes and 5α-hydroxy-6β-amino-pregnanes. The preparation of the latter involves more particularly converting a 5α,6β-epoxysteroid of the pregnane series into the corresponding 5α-hydroxy-6β-aminosteroid of the pregnane series substantially by two steps, i.e., ring opening and reduction.

Hitherto, it has been known that simple epoxides can be opened with amines or ammonia [Eliel: Steric Effects in Organic Chemistry, p. 106 (1956)]. On the basis of this knowledge, Batres et al. have succeeded in the ring opening of 5α,6α-epoxysteroids with amines to produce 5α-hydroxy-6β-aminosteroids wherein the amino group is tertiary [Batres et al.: J. Org. Chem., vol. 26, p. 878 (1961)]. The present inventor has attempted to synthesize a steroid having a free amino group and, on the basis of the said knowledge, to react a 5α,6α-epoxysteroid with ammonia. As the result of the attempt, however, only a resinous material has been recovered with no production of the objective amine. It has now been discovered that a 5α,6α-epoxysteroid is ring-opened with hydrogen azide or alkali azide and the resuling 5α-hydroxy-6β-azidosteroid reduced in a per se conventional procedure to give the 5α-hydroxy-6β-aminosteroid. The present invention is based on this discovery.

Accordingly, it is a basic object of the present invention to embody 5α-hydroxy-6β-aminosteroids of the pregnane series which are pharmacologically active. A further object of the invention is to embody 5α-hydroxy-6β-azidosteroids of the pregnane series which are intermediates in the said route. Other objects will be apparent to those conversant with the art to which the present invention pertains from the subsequent description.

According to the present invention, the starting 5α,6α-epoxysteroid of pregnane series is first subjected to epoxy linkage fission by treating the same with hydrogen azide or alkali azide (e.g., sodium azide, potassium azide). The reaction is advantageously carried out in a suitable diluent such as water, methanol, ethanol, ether, dioxane and tetrahydrofuran or in a mixture of two or more such solvents. The reaction temperature may range, for example, from 80 to 150° C. when the reaction is executed in a sealed tube. The resulting 5α-hydroxy-6β-azidosteroid of the pregnane series is then subjected to reduction in a per se conventional manner. As the reduction procedure, there may be advantageously adopted a catalytic reduction procedure or a reduction procedure using a reducing agent such as metal hydride. When the reduction procedure using a metal hydride (e.g., lithium aluminum hydride, lithium tritertiary butoxy aluminum hydride) is adopted, the reaction may be carried out by treating the 5α-hydroxy-6β-azidosteroid of the pregnane series with the metal hydride in an inert organic solvent such as ether, tetrahydrofuran and dioxane advantageously at a temperature between room temperature (15 to 30° C.) and the boiling temperature of the solvent employed.

The resulting 5α-hydroxy-6β-aminosteroid of the pregnane series may be, if necessary, further converted into the corresponding 5α-hydroxy-6β-acylaminosteroid of the pregnane series by a conventional acylation procedure such as treatment with a lower alkonoic anhydride (e.g., acetic anhydride, propionic anhydride) and an organic base (e.g., pyridine, picoline), the latter being sometimes purified more readily than the former.

The thus-produced 5α-hydroxy-6β-aminosteroid of the pregnane series and the 6-acylate thereof are useful as CNS (central nervous system) depressing agents. For instance, 5α-hydroxy-6β-aminopregnane-3,20-dione induces anesthetic state in mice, when administered at a non-toxic dose by intraperitoneal route.

The starting 5α,6α-epoxysteroid of the pregnane series may, apart from the substituent at the 5- and 6-positions, contain further substituents, such as free or functionally converted hydroxyl, oxo or carboxyl groups, also methyl groups, and it may also contain double bonds. In the course of the reduction step of the present process, free oxo groups may be simultaneously converted into hydroxyl groups and free and functionally converted carboxyl groups into hydroxymethyl groups. If such simultaneous conversion is not favorable, the previous protection of the convertible groups according to a per se conventional manner is required. Specific starting materials are, for example, 5α,6α-epoxypregnane-3,20-dione [Ellis et al.: J. Chem. Soc., p. 4417 (1956)], 21-hydroxy-5α,6α-epoxypregnane-3,20-dione (1956)], 21 - hydroxy - 5α,6α-epoxypregnane-3,20-dione 21-acetate [Ellis et al.: J. Chem. Soc., p. 4417 (1956)], 11β,17α-dihydroxy-21 acetoxy - 5α,6α - epoxypregnane-3,20-dione 3,20-bisethyleneketal [Bernstein et al.: U.S. Patent 2,742,461], 3β,21-dihydroxy-5α,6α-epoxypregnan-20-one 21-acetate [Ellis et al.: J. Chem. Soc., p. 4417 (1956)], 3β - hydroxy - 5α,6α - epoxypregnan - 20 - one [Ellis et al.: J. Chem. Soc., p. 4417 (1956)], 3β-hydroxy-5α,6α-epoxypregnan-20-one 3-acetate [Ellis et al.: J. Chem. Soc., p. 4417 (1956)], 3β,20-dihydroxy-5α,6α-epoxypregnane 3,20-diacetate [Ringold et al.: J. Org. Chem., vol. 22, p. 99 (1957)], 3β,20-dihydroxy-5α,6α, 16α,17α - diepoxy-20-pregnene 3,20 - diacetate [Slomp: U.S. Patent 2,751,381], 3β-hydroxy-5α,6α - epoxy-16-pregnen-20-one [Slomp: U.S. Patent 2,751,381], 5α,6α-epoxypregnane-3,20-dione 3,20-bisethyleneketal [Cooley et al.: J. Chem Soc., p. 4112 (1957)], 11α-hydroxy 5α, 6α - epoxypregnane - 3,20 - dione 3,20 - bisethyleneketal [Cooley et al.: J. Chem. Soc., p. 4112 (1957], methyl 3,3 - bisethylenedioxy - 5α,6α-epoxy-11-oxo-17-pregnen-21-oate [Hogg et al.: U.S. Patent 2,841,600], 5α,6α-epoxypregnane-3,20-dione 3-ethyleneketal [Bowers et al.: Tetrahedron, vol. 7, p. 138 (1959)], 17α,21-diacetoxy-5α,6α-epoxypregnane-3,20-dione 3-ethyleneketal [Bowers et al.: Tetrahedron, vol. 7, p. 138 (1959)], etc.

The following examples illustrate presently-preferred embodiments of the invention. In these examples, each of the abbreviations has the conventional meaning, e.g., mg.=milligram(s), g.=gram(s), ml.=milliliter(s), °C.= degrees centigrade.

Example 1.

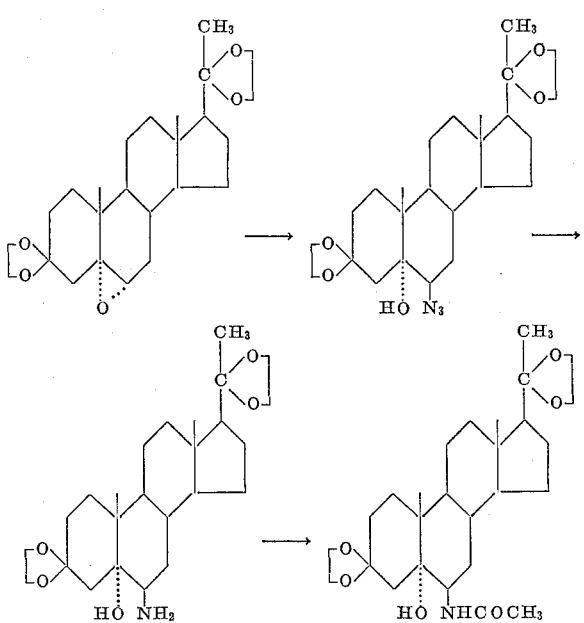

(A) Preparation of 5α-hydroxy-6β-azidopregnane-3,20-dione 3,20-bisethyleneketal: To a solution of 5α,6α-epoxypregnane-3,20-dione 3,20-bisethyleneketal [Bowers et al.: Tetrahedron, vol. 7, p. 138 (1959)] (1.00 g.) in ethanol (8 ml.) and dioxane (1 ml.), there is added a solution of sodium azide (0.48 g.) in water (3 ml.), and the resultant mixture is heated in a sealed tube for 36 hours at 120° C. The reaction mixture is concentrated under reduced pressure to a one-third volume. The resulting concentrated mixture is filtered to eliminate the precipitated crystals which are those of the starting material. The filtrate is further concentrated under reduced pressure to give an oil (0.65 g.). The oil is chromatographed on alumina (19 g.). The eluate with benzene-petroleum ether (1:5~1:1) is evaporated and the residue crystallized from methanol to give 5α-hydroxy-6β-azidopregnane-3,20-dione 3,20-bisethyleneketal (0.32 g.) as crystals melting at 118.5° C.

*Analysis.*—Calcd. for $C_{25}H_{39}O_5N_3$: C, 65.05; H, 8.52 N, 9.10. Found: C, 65.11; H, 8.64; N, 9.10.

(B) Preparation of 5α-hydroxy-6β-aminopregnane-3,20-dione 3,20-bisethyleneketal: A solution of 5α-hydroxy-6β-azidopregnane-3,20-dione 3,20-bisethyleneketal (2.59 g.) in anhydrous tetrahydrofuran (60 ml.) is added dropwise to a solution of lithium aluminum hydride (2 g.) in anhydrous ether (60 ml.) at room temperature (15 to 30° C.) while stirring, and the resultant mixture is stirred at room temperature for 2.5 hours. The reaction mixture is combined with ether and water and then shaken with chloroform. The organic solvent layer is washed with water, dried over anhydrous sodium sulfate and concentrated under reduced pressure. The residue is crystallized from methanol to give 5α-hydroxy-6β-aminopregnane-3,20-dione 3,20-bisethyleneketal (2.35 g.) as crystals melting at 180 to 181° C.

*Analysis.*—Calcd. for $C_{25}H_{41}O_5N$: C, 68.93; H, 9.49; N, 3.22. Found: C, 68.62; H, 9.53; N, 3.12.

(C) Preparation of 5α-hydroxy-6β-acetylaminopregnane-3,20-dione 3,20-bisethyleneketal: To a mixture of acetic anhydride (2 ml.) and pyridine (10 ml.), there is added 5α-hydroxy-6β-aminopregnane-3,20-dione 3,20-bisethyleneketal (2.41 g.), and the resultant mixture is allowed to stand at room temperature (15 to 30° C.) for 15 hours. The reaction mixture is combined with ice-water. The precipitated crystals are colletced by filtration, washed with water, dried and recrystallized from a mixture of methanol and ether to give 5α-hydroxy-6β-acetyl- aminopregnane-3,20-dione 3,20-bisethyleneketal (1.66 g.) as crystals melting at 260.5 to 261.5° C.

*Analysis.*—Calcd. for $C_{27}H_{43}O_6N$: C, 67.89; H, 9.03; N, 2.93. Found: C, 67.65; H, 9.24; N, 2.98.

Example 2.

(In the following scheme, the step represented by a dotted line is actually a plurality of steps.)

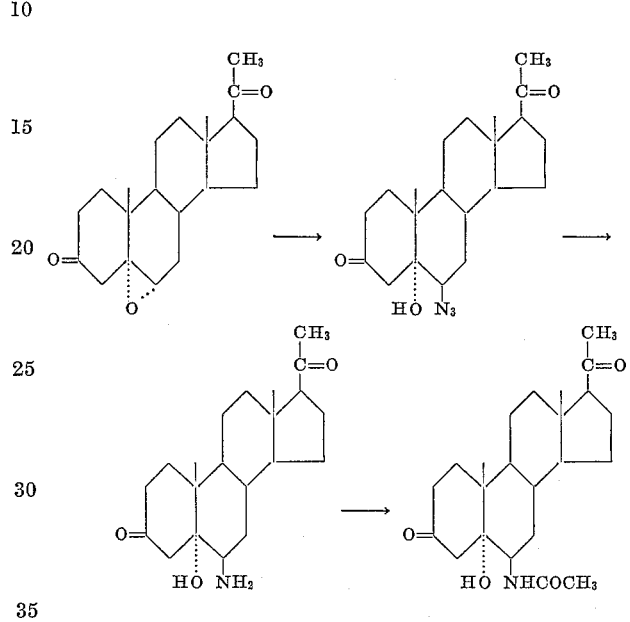

(A) Preparation of 5α-hydroxy-6β-azidopregnane-3,20-dione: 5α,6α-epoxypregnane-3,20-dione [Ellis et al.: J. Chem. Soc. p. 4417 (1956)] is subjected to reaction with sodium azide as in Example 1 (A) whereby 5α-hydroxy-6β-azidopregnane-3,20-dione is produced. Recrystallization of the product from a mixture of acetone and hexane gives crystals melting at 223 to 226° C. (decomp.).

*Analysis.*—Calcd. for $C_{21}H_{31}O_3N_3$: C, 67.53; H, 8.37; N, 11.35. Found: C, 67.69; H, 8.53; N, 11.55.

(B) Preparation of 5α-hydroxy-6β-aminopregnane-3,-20-dione: To a solution of 5α-hydroxy-6β-aminopregnane-3,20-dione 3,20-bisethyleneketal [cf. Example 1 (B)] (2.00 g.) in acetone (50 ml.), there is added a mixture of p-toluenesulfonic acid hydrate (1.2 g.) in water (0.3 ml.) in nitrogen stream, and the resulting mixture is allowed to stand at about 60° C. for 30 minutes. The reaction mixture is combined with water, made alkaline with sodium hydroxide and shaken with chloroform. The chloroform layer is washed with water, dried over anhydrous sodium sulfate and concentrated under reduced pressure. The residue is crystallized from a mixture of acetone and ether to give 5α-hydroxy-6β-aminopregnane-3,20-dione (535 mg.) as crystals melting at 235 to 245° C. (decomp.).

*Analysis.*—Calcd. for $C_{21}H_{33}O_3N$: C, 72.58; H, 9.57; N, 4.03. Found: C, 72.85; H, 9.63; N, 4.31.

(C) Preparation of 5α - hydroxy - 6β - acetylaminopregnane-3,20-dione: In a mixture of acetic anhydride (2 ml.) and pyridine (10 ml.), there is dissolved 5α-hydroxy-6β-aminopregnane-3,20-dione (2.35 g.), and the resultant solution is allowed to stand at room temperature (15 to 30° C.) for 15 hours. The reaction mixture is combined with ice-water. The precipitated crystals are collected by filtration, washed with water, dried and recrystallized from methanol to give 5α-hydroxy-6β-acetylaminopregnane-3,20-dione (1.72 g.) as crystals melting at 244 to 247° C.

*Analysis.*—Calcd. for $C_{23}H_{35}O_4N.1/2H_2O$: C, 69.31; H, 9.11; N, 3.44. Found: C, 69.32; H, 9.34; N, 3.26.

Example 3

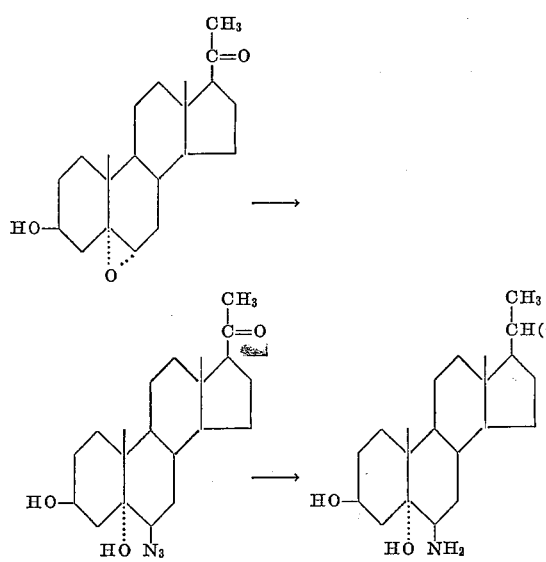

(A) Preparation of 3β,5α-dihydroxy-6β-azidopregnan-20-one: 3β-hydroxy-5α,6α-epoxypregnan-20-one [Ellis et al.: J. Chem. Soc., p. 4417 (1956)] is subjected to reaction with sodium azide as in Example 1 (A) whereby 3β,5α-dihydroxy-6β-azidopregnan-20-one is produced. Recrystallization of the product from a mixture of acetone and petroleum ether gives crystals melting at 198 to 200° C.

*Analysis.*—Calcd. for $C_{21}H_{33}O_3N_3$: C, 67.17; H, 8.86; N, 11.19. Found: C, 67.39; H, 8.91; N, 11.05.

(B) Preparation of 3β,5α,20-trihydroxy-6β-aminopregnane: 3β,5α-dihydroxy-6β-azidopregnan-20-one is subjected to reduction as in Example 1 (B) whereby 3β,5α,20-trihydroxy-6β-aminopregnane is produced.

What is claimed is:
1. 3β,5α-dihydroxy-6β-azidopregnan-20-one.
2. 5α-hydroxy-6β-aminopregnane-3,20-dione 3,20-bisethyleneketal.
3. 5α-hydroxy-6β-aminopregnane-3,20-dione.
4. 3β,5α,20-trihydroxy-6β-aminopregnane.
5. 5α-hydroxy-6β-acetylaminopregnane-3,20-dione 3,20-bisethyleneketal.
6. 5α-hydroxy-6β-acetylaminopregnane-3,20-dione.

References Cited
UNITED STATES PATENTS
2,996,521  8/1961  Mathews et al. _____ 260—349

OTHER REFERENCES

Boyer et al.: "Alkyl and Aryl Azides," Chemical Reviews, vol. 54, No. 1, Feburary 1954, p. 10.

LEWIS GOTTS, *Primary Examiner.*

J. R. GENTRY, J. R. BROWN, *Assistant Examiners.*